H. O. STIRES & L. W. SMITH.
HORSE RELEASER.
APPLICATION FILED MAY 8, 1909.
938,721.
Patented Nov. 2, 1909.
2 SHEETS—SHEET 2.
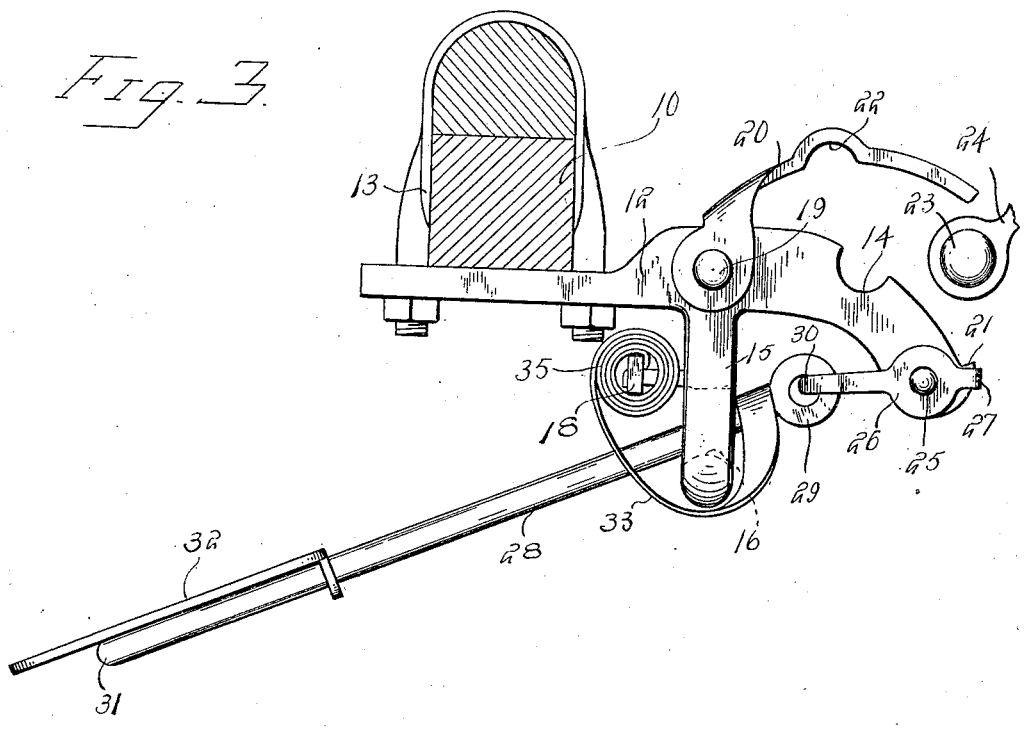
Fig. 3.
Fig. 4.
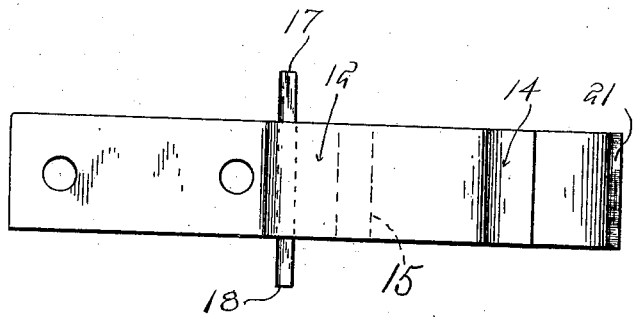
Witnesses
J. C. Simpson
C. N. Woodward
Inventors
Howard O. Stires
Lester W. Smith
By Chandler & Chandler
Attorneys

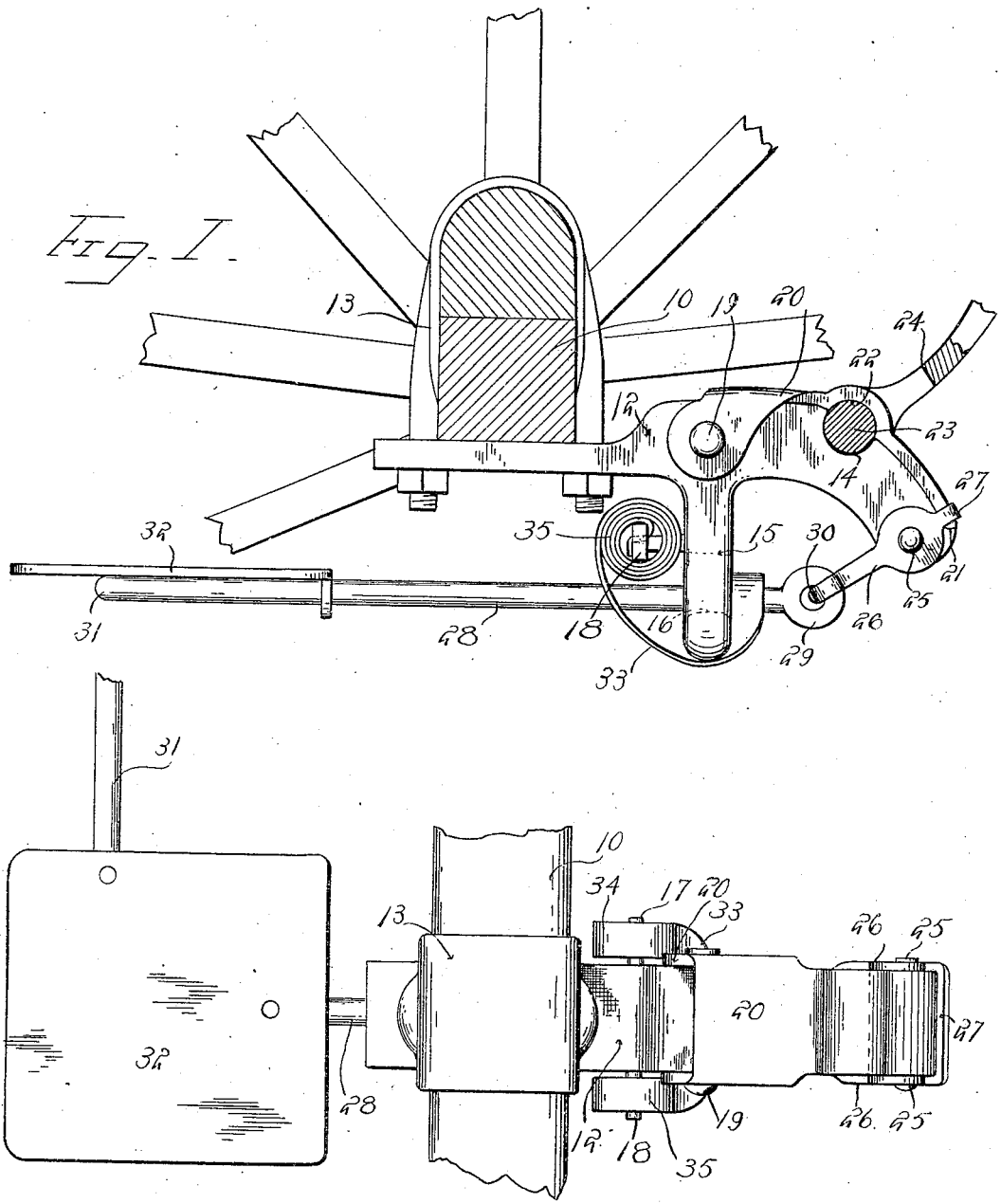

UNITED STATES PATENT OFFICE.

HOWARD O. STIRES AND LESTER W. SMITH, OF TRENTON, NEW JERSEY.

HORSE-RELEASER.

938,721.

Specification of Letters Patent.

Patented Nov. 2, 1909.

Application filed May 8, 1909. Serial No. 494,856.

*To all whom it may concern:*

Be it known that we, HOWARD O. STIRES and LESTER W. SMITH, citizens of the United States, residing at Trenton, in the county of Mercer, State of New Jersey, have invented certain new and useful Improvements in Horse-Releasers; and we do hereby declare the following to be a full, clear, and exact description of the invention, such as will enable others skilled in the art to which it appertains to make and use the same.

This invention relates to attachments for vehicles for instantly releasing the horse therefrom, and has for one of its objects to simplify and improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention.

Figure 1 is a side elevation of a portion of a vehicle including the forward axle and the body with the improvement applied and the parts in closed position. Fig. 2 is a plan view of the parts shown in Fig. 1. Fig. 3 is a side elevation of the improved device with the parts in released position. Fig. 4 is a plan view of the body member of the improved device detached.

The improved device comprises two body portions attached to the forward axle in place of the ordinary thill clips, and the clamp portions of the thill clips are utilized to secure the improved device in position. The improved device may be attached without material structural changes to vehicles of various kinds, and may be applied to tongues or thills as required, and for the purpose of illustration the improved device is shown attached to a conventional axle represented at 10.

The two coupling devices are precisely alike and the description of one will suffice for all, and like reference characters are employed for like parts in each. The improved device comprises a body 12 with a reduced rear portion beneath the axle 10 and coupled thereto by the usual clamp device 13 of the thill or tongue clip. The body 12 extends forwardly of the axle and is curved downwardly at its free end and provided with a half-socket 14 spaced from its free end and with a depending portion 15, the portion 15 provided with a transverse aperture 16 and with a rearwardly extended portion provided with laterally extending lugs or ears 17—18. Swinging at 19 upon the body 12 is a latch member 20, the latch member being curved to correspond to and bear upon the curved portion of the body 12 and bearing at its free end against the shoulder 21 upon the body 12 and with a half-socket 22 corresponding to the half-socket 14 and forming together therewith a complete socket to receive the pin 23 of the shackle member 24 of the thill or tongue. Swinging at 25 upon the member 12 adjacent to the shoulder 21 is a lock device 26, preferably in the form of a complete loop with the forward portion 27 bearing over the free end of the latch 20 adjacent to the shoulder 21.

Extending through the aperture of the depending member 15 is a rod 28 having an eye 29 at its forward end movably engaging the rear end 30 of the lock member 26. The rear ends of the rods 28 are connected by a transverse bar 31, the two portions 28 and the transverse portion 31 being preferably formed from one single rod bent into the required shape.

Connected to the rods 28 at their junctures with the transverse portion 31 is a treadle or step 32, the treadle being thus located in convenient position for the foot of the driver, as hereafter explained. Bearing over the rod 28 in advance of the depending member 15 is a spring 33 formed from a single strip of resilient metal bent centrally over the rod and thence carried rearwardly and upwardly and formed into coils 34—35 extending around the ears or lugs 17—18 and secured thereto, preferably by passing the inner terminals of the coils through apertures in the ears, as shown. By this means the force of the spring 33 is exerted downwardly upon the portion of the rod which is located in advance of the member 15, and thus maintains the lock device 26 yieldably in engagement with the latch 20, as shown in Fig. 1. The spring 35 will possess strength to maintain the lock device 26 against any strains or jars to which they will be subjected when in use, and thus effectually prevent the displacement of the thills or tongue shackles. With a device thus constructed it will be obvious that so long as the horse is moving under normal conditions the thills or tongue will remain coupled to the vehicle, but in event of the horse becoming unruly or attempting to run away the driver can instantly release the horse from the vehicle by pressure applied with his foot upon the step or treadle 32, which depresses the rear end of the rods 28 and elevates their forward ends and actuates the lock levers 26 and detaches the portions 27 from the latches 20 and thus releases the thills or tongues. The two rods 28 being coupled by the transverse rod 31 the pressure applied to either of the plates 32 will cause the simultaneous release of the latch members 20 of each of the devices.

The improved device is simple in construction, can be inexpensively manufactured and applied to vehicles of various construction, and operates effectually for the purposes described.

What is claimed is:—

1. A device of the class described comprising a body adapted to be connected to an axle and having a socket spaced from its outer end and with a depending member, a latch device mounted to swing upon said body and extending over said socket, a lock device mounted to swing from said body in advance of said socket and movably engaging said latch device, a trip lever movably connected to said depending member and coupled to said lock device, and a spring operating to maintain said lever yieldably in one position.

2. A device of the class described comprising a body adapted to be connected to an axle and having a socket spaced from its outer end and with a depending member, said depending member having oppositely extending lateral lugs, a latch device mounted to swing upon said body and extending over said socket, a lock device mounted to swing from said body in advance of said socket and movably engaging said latch device, a trip lever movably connected to said depending member and coupled to said lock device, and a resilient member engaging over said rod and with terminal coils connected to said lateral lugs.

In testimony whereof, we affix our signatures, in presence of two witnesses.

HOWARD O. STIRES.
LESTER W. SMITH.

Witnesses:
JOSEPHINE J. FOLEY,
CLARENCE O. SMITH.